(12) United States Patent
Asthana et al.

(10) Patent No.: US 10,460,224 B1
(45) Date of Patent: Oct. 29, 2019

(54) SYSTEMS AND METHODS FOR ENABLING RFID SESSIONS BASED ON IMAGER BASED OBJECT DETECTION

(71) Applicant: Zebra Technologies Corporation, Lincolnshire, IL (US)

(72) Inventors: Amit Asthana, Germantown, MD (US); Christopher P. Klicpera, Westbury, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 1 day.

(21) Appl. No.: 16/012,386

(22) Filed: Jun. 19, 2018

(51) Int. Cl.
*G06K 19/07* (2006.01)
*G06K 19/077* (2006.01)
*G06K 7/10* (2006.01)

(52) U.S. Cl.
CPC ....... *G06K 19/0728* (2013.01); *G06K 7/1097* (2013.01); *G06K 7/10831* (2013.01); *G06K 7/10881* (2013.01); *G06K 19/07773* (2013.01)

(58) Field of Classification Search
CPC .......... G06K 19/0728; G06K 7/10881; G06K 7/10831; G06K 19/07773; G06K 7/1097
See application file for complete search history.

(56) References Cited

U.S. PATENT DOCUMENTS

| 6,415,978 B1 * | 7/2002 | McAllister | G06K 7/0004 235/462.01 |
| 7,510,110 B2 * | 3/2009 | Pietrzyk | G05B 19/05 235/375 |
| 2007/0095911 A1 * | 5/2007 | Shimura | G06K 7/0004 235/440 |
| 2009/0045261 A1 * | 2/2009 | Pine | G06K 7/0004 235/462.42 |
| 2009/0321525 A1 * | 12/2009 | Barkan | G06K 7/10346 235/472.01 |
| 2011/0121075 A1 * | 5/2011 | Bellows | G06K 7/0004 235/440 |
| 2016/0350563 A1 * | 12/2016 | Ye | G06K 7/109 |
| 2019/0130150 A1 * | 5/2019 | Handshaw | G06K 7/10881 |

FOREIGN PATENT DOCUMENTS

EP 2711863 A1 * 3/2014 ........... G06K 7/0004

* cited by examiner

*Primary Examiner* — Sonji N Johnson
(74) *Attorney, Agent, or Firm* — Yuri Astvatsaturov

(57) ABSTRACT

A scanning device is disclosed for enabling radio frequency identification (RFID) sessions based on imager based object detection. The scanning device includes an optical imaging assembly having an optical field of view (FOV) and an effective reading range for capturing image(s) corresponding to product code(s). The scanning device includes an RFID reader having an RFID antenna configured to emit a radiation pattern extending over at least the optical FOV and the effective reading range of the optical image assembly for reading RFID tag(s). During a scanning session, initiated when a product enters the effective reading range and optical FOV, or the radiation pattern, a processor activates the optical imaging assembly, activates the RFID reader, and terminates the scanning session upon the occurrence of either: the optical imaging assembly scanning a product code associated with the product, or the RFID reader reading an RFID tag associated with the product.

10 Claims, 3 Drawing Sheets

SYSTEMS AND METHODS FOR ENABLING RFID SESSIONS BASED ON IMAGER BASED OBJECT DETECTION

BACKGROUND OF THE INVENTION

Scanners are electronic devices used to read or scan information from barcodes and/or radio frequency identification (RFID) tags associated with packages or other items. For example, such scanners may be used in retail, warehouse, factory, or other environments by employees, contractors, personnel or other such users, to read or scan barcodes, RFID tags, or other information from retail packages or other items, and may be used in applications ranging from retail sales, inventory management, shipping and tracking, and for a variety of other applications.

Some scanners may incorporate multiple, different scanning technologies and related hardware to perform different functions. For example, a scanner may contain both an imaging barcode reader for scanning barcodes and an RFID radio for reading RFID tags. A problem may arise, however, because these different scanning technologies typically operate independently and create issues with the type of, or amount of, information scanned or read (e.g., information read or scan from products in a particular environment). For example, independent operation of an imaging barcode reader and an RFID reader generally results in vastly different data capture ranges because of the underlying and different physical capabilities or limitations of the underlying hardware. For example, an RFID reader of a scanner generally operates independently of other hardware the scanner, where the RFID reader often picks up stray RFID tags causing false positive reads, and, which causes unwanted data to be read. This is especially problematic in retail environments where customers or other individuals may move through high traffic areas, such as point-of-sale (POS) lanes, where scanners are located, causing the scanners to activate, and, therefore read or scan at times that are unintended.

In addition, scanners with multiple, different scanning technologies and related hardware (e.g., imaging barcode reader and RFID subsystems) typically suffer from increased usage of electricity required to power the multiple scanning technologies and related hardware, where, e.g., running both an imaging barcode reader and an RFID reader generally results in wasteful power consumption.

Accordingly, there is a need for solutions that solve issues regarding scanners that incorporate multiple scanning technologies and related hardware, for example, via scanning devices, and related methods, for enabling RFID sessions based on imager based object detection.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
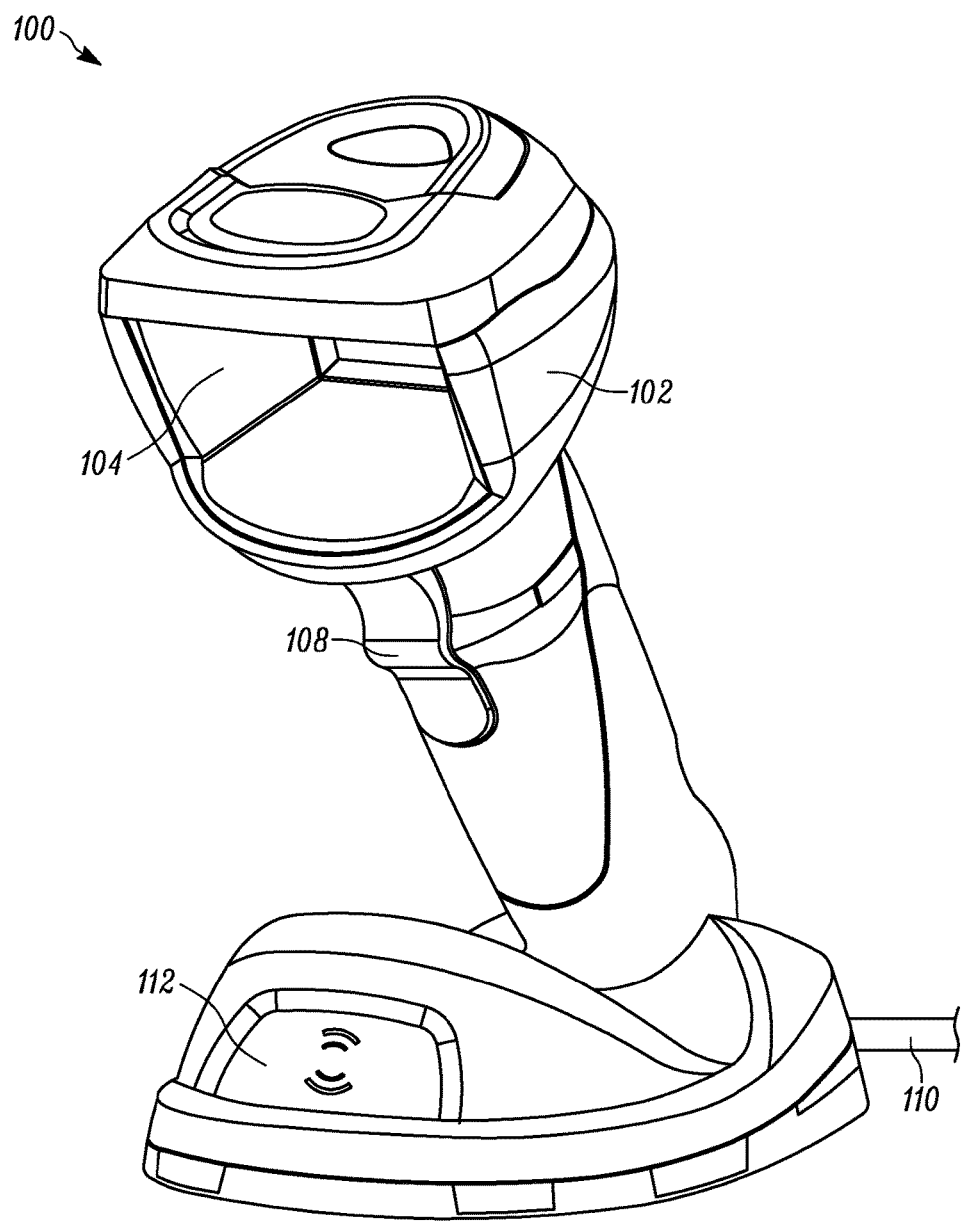
FIG. 1 illustrates a perspective view of an example scanning device in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In various embodiments of the present disclosure, a scanning device, and related methods, are described for enabling RFID sessions based on imager based object detection. The scanning device, and related methods, of the present disclosure provide solutions where, e.g., scanning devices with multiple scanning technologies and related hardware, such as scanning devices with optical imaging assemblies and RFID readers, generally operate in a synchronized or otherwise linked fashion. Such scanning devices may appear to users of such scanning devices as having identical, approximately identical, or similar operating envelopes for both range and field of view of an optical imaging assembly and an RFID reader—even though such operating envelops rely on different physical characteristics, e.g., on the one hand light emitted via LEDs/lasers and scanners from an optical imaging assembly, and on the other hand radio waves emitted from an RFID reader.

For example, while the aiming, illumination pattern(s) of an optical imaging assembly may be visible to a user (e.g., via a red or other color laser or other projected lighting of a scanner), the radio waves emitted by an RFID reader may not be visible such that a user would not have any indicator of the RFID reader's capture range. In various embodiments, the disclosure of the present application describes synchronizing, or otherwise linking, object detection mechanisms of the optical imaging assembly and the RFID reader across a scanning session to provide synchronized reading and scanning to, e.g., eliminate false positive reads or scans and/or to synchronize the reading or scanning ranges of the optical imaging assembly and the RFID reader.

Other benefits may be realized from the synchronization, or linking, or the operations of the optical imaging assembly and RFID reader. For example, and as further described herein, in some embodiments, the RFID reader may generally operate in a low power mode rather than a presentation mode. Such a configuration both saves power and prevents unwanted stray RFID reads from tagged objects (e.g., products) that may come too close to the RFID reader. In such a configuration, when an object is detected (e.g., via image based object detection, IR proximity sensor detection, or scene detect) within an imaging field of the optical imaging assembly, the scanning device can, via its processors, initiate an RFID read session, barcode scan session, or both. In this way, the scanning device may operate the RFID reader in a low power mode until the optical imaging assembly activates the RFID reader, thus, saving power consumed by the scanning device across each of its imaging and RFID subsystems.

An additional benefit includes the perceived reading range of the scanning device as experienced by a user. For example, when a scanning device is configured as disclosed herein, the RFID reader will appear to read RFID tags within the same or similar vicinity of the optical field of view (FOV) and the effective reading range of the optical imaging assembly, giving the illusion to the user of an aligned operating range and FOV for both the optical imaging assembly and the RFID reader. Such a configuration provides a more intuitive scanning experience for the user, where the user would perceive elimination of, or a drastic reduction of, false positive reads, e.g., caused by RFID readers with a too broad, or misaligned, radiation reading pattern.

Accordingly, in various embodiments herein, a scanning device, and related methods, for enabling RFID sessions based on imager based object detection are disclosed. For example, a scanning device of the present disclosure may include an optical imaging assembly having an optical FOV and an effective reading range. The optical imaging assembly may operate to capture one or more images corresponding to one or more product codes positioned within the reading range. For example, in various embodiments, product codes may include barcodes or quick response (QR) codes.

The scanning device may further include an RFID reader having an RFID antenna. The RFID reader may be configured to emit, via the RFID antenna, a radiation pattern, where the radiation pattern is configured to extend over at least the optical FOV and the effective reading range of the optical image assembly, such that the RFID reader is operable to read one or more RFID tags. In certain embodiments, the radiation pattern may be configured to extend a distance equal to or approximately equal to the effective range of the optical imaging assembly.

The scanning device may include a processor communicatively coupled to the optical image assembly and the RFID reader. The processor may be configured to initiate a scanning session when a product enters the effective reading range and the optical FOV of the optical imaging assembly, or, in the alternative, or to initiate a scanning session when the product enters the radiation pattern of the RFID reader.

For example, in certain embodiments, the product may be detected entering the effective reading range and within the optical FOV based on any of: image feature object detection, infrared (IR) proximity detection, or image scene detection, each as disclosed further herein. In such embodiments, the optical imaging assembly may be operating in a presentation mode operable to implement at least one of image feature object detection, IR proximity detection, or image scene detection.

During the scanning session, the processor may be configured to activate the optical imaging assembly, activate the RFID reader, and terminate the scanning session upon the occurrence of at least one of: (1) the optical imaging assembly scanning a product code associated with the product, or (2) the RFID reader reading an RFID tag associated with the product. It is to be understood that the scanning session may begin either when the scanning device detects, or otherwise begins, a reading or scanning session with either the optical imaging assembly or the RFID reader.

FIG. 1 illustrates a perspective view of an example scanning device 100 in accordance with various embodiments disclosed herein. Scanning device 100 includes an optical imaging assembly 102, with a scanning window 104. Optical imaging assembly 102 may include an image sensor (e.g., image sensor 202 of FIG. 2) that may include a plurality of photo-sensitive elements. The photo-sensitive elements may be arranged in a pattern and may form a substantially flat surface. For example, the photo-sensitive elements may be arranged in a grid or a series of arrays forming a 2D surface. The image sensor of the optical imaging assembly 102 may have an imaging axis that extends through scanning window 104 for the purpose of capturing 1D or 2D images (e.g., barcodes).

As described further herein, the optical imaging assembly 102 may have an effective reading range defined by the image sensor, e.g., where the effective reading range may correspond to the physical range of the laser or other optical wavelength projected by the image sensor. The optical imaging assembly 102 may also have an optical field of view (FOV) defined by the image sensor and fitting the scanning window 104. For example, the optical FOV may be shaped by the effective reading range of the image sensor and be configured to extend through the opening defined by the scanning window 104. In certain embodiments, the imaging axis of the image sensor may be coaxial with the optical FOV, where each may extend through scanning window 104.

Scanning device 100 also include RFID reader 112. RFID reader 112 includes an RFID radio antenna (e.g., RFID antenna 212 of FIG. 2) configured to emit an RFID based radiation pattern (e.g., a radio frequency RF field of view). In certain modes, the RFID reader 112 may operate to automatically read RFID tags within the radiation pattern emitted by RFID reader 112. In some embodiments, the RFID reader may be an ultra-high frequency (UHF) RFID reader.

Scanning device 100 further includes trigger 108. In some embodiments, trigger 108 may activate each of the optical imaging assembly 102 and the RFID reader 112 together for a scanning session as disclosed herein. In other embodiments, trigger 108 may be configured to activate, at least initially, one of the optical imaging assembly 102 or the RFID reader 112 where, for example, a top portion of trigger 108 activates the optical imaging assembly 102 and a bottom portion of trigger 108 activates the RFID reader 112, or vice versa. It is to be understood however, that activation of the optical imaging assembly 102 and/or the RFID reader 112 need not occur solely through trigger 108, and that scanning device 100 may also operate in a "hands-free" mode where activation of the optical imaging assembly 102 and/or the RFID reader 112 may occur upon the detection of products in the vicinity, field of view, effective reading range, etc. of scanning device 100.

Accordingly, with optical imaging assembly 102 and RFID reader 112, scanning device 100 is operable to provide 1D and/or 2D bar code scanning and RFID tag reading and transfer, and is further operable to provide a flexible hands-free or hand-held design. Scanning device 100 may accommodate both counter-top and hand-held use.

In various embodiments, activation of the optical imaging assembly 102, e.g., via trigger 108, may cause the optical imaging assembly 102 to capture image data or information. Such image data or information may include, for example, product codes (e.g., barcodes or QR codes) associated with corresponding products. In other embodiments, the data or information may include signature information or data.

Similarly, activation of the RFID reader 112, e.g., via trigger 108, may cause the RFID reader 112 to capture tag data or other such information. Such tag data or other information may be encoded, for example, on one or more RFID tags associated with one or more corresponding products.

The data or information captured from either the optical imaging assembly 102 and/or the RFID reader 112 may be transmitted to POS stations, servers, or other processing devices for a variety of purposes including, e.g., product purchases, data storage, inventory purposes, etc. Scanning device 100 includes a cabling interface 110 for transmission of such data or information. In various embodiments, scanning device may support several data transmission interfaces including, for example, USB, Standard RS-232, IBM 468X/469X, Simple Serial Interface (SSI), or other similar data transmission interfaces standards.

Scanning device 100 may also include a processor (e.g., processor 222 of FIG. 2) for enabling RFID sessions based on imager based object detection as described herein. For example, the processor of the scanning device 100 may initiate a scanning session in which both the optical imaging assembly 102 and the RFID reader 112 are activated.

Figure 2:
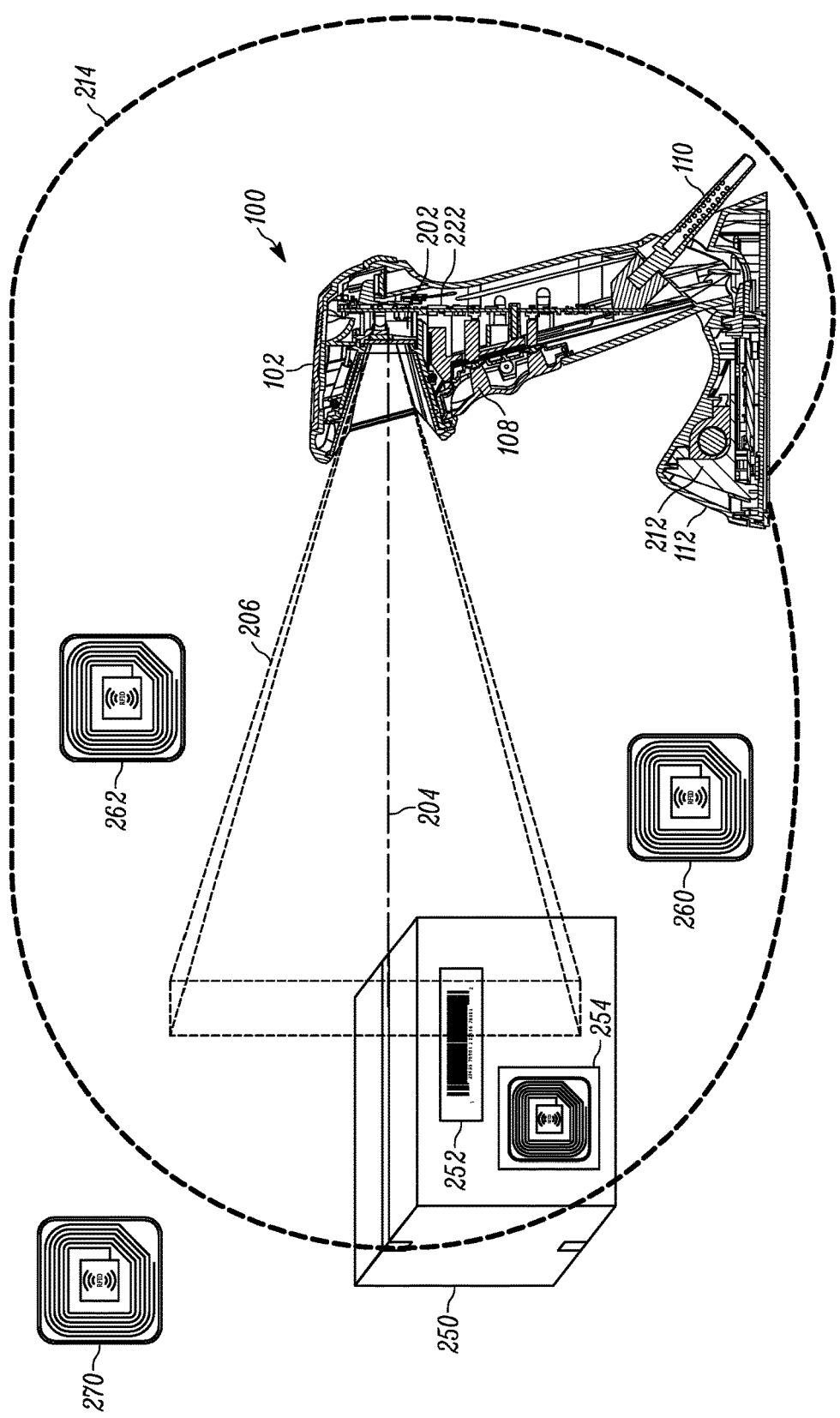
FIG. 2 illustrates a cross section view of the example scanning device of FIG. 1 in accordance with various embodiments regarding optical image capture and RFID tag reading as disclosed herein.

FIG. 2 illustrates a cross section view of the example scanning device 100 of FIG. 1 in accordance with various embodiments regarding optical image capture and RFID tag reading as disclosed herein. Scanning device 100 includes a processor 222 for capturing and processing images, initiating scanning sessions, and for implementing or performing other features described herein.

Scanning device 100 includes optical imaging assembly 102. As shown for FIG. 2, the optical imaging assembly 102 has an optical FOV 206 and an effective reading range 204. The effective reading range 204 may be defined by image sensor 202. Image sensor 202 may include a plurality of photosensitive elements configured to capture, via exposure of light on the photosensitive elements, 1D or 2D images (e.g., barcodes or signatures). Optical FOV 206 may be defined by, or at least associated with, the image sensor 202 and the opening (e.g., scanning window 104) of the optical imaging assembly 102. As described herein, in some embodiments, optical FOV 206 is shaped by the range of the image sensor 202 and fits the dimensions of the opening of the optical imaging sensor.

The optical imaging assembly 102, via the image sensor 202, may operate to capture image(s) corresponding to product code(s) positioned within the effective reading range 204. As described in various embodiments herein, product codes may include barcodes or quick response (QR) codes. For example, product 250 (e.g., which may represent product packaging) is associated with barcode 252. Barcode 252 may be captured via optical imaging assembly 102 when a user positions the scanning device 100 such that the effective reading range 204 and optical FOV 206 overlaps with barcode 252 on product 250. In some embodiments, a user may activate the optical imaging assembly 102 using trigger 108. In other embodiments, optical imaging assembly 102 may be operating hands-free in a presentation mode. In some embodiments, presentation mode includes operating the optical imaging assembly 102 via any one of image feature object detection, IR proximity detection, or image scene detection. Presentation mode generally requires less processing power and little to no illumination, resulting in overall power savings and less heat buildup.

For example, for image feature object detection, the optical imaging assembly 102 is configured to scan sensor images to detect if an object, such as a barcode, is present. Such detection can be based on content contrast detection, lighting condition detection, relative timing of received sensor images, and mode (e.g., handheld, or presentation). If an object is detected, processor 222 is activated. Active mode typically consumes more power than presentation mode. Thus, operating the scanning device 100 in presentation mode when scanning device 100 is not in use reduces power consumption.

The optical imaging assembly 102 may also operate to capture images via IR proximity detection or image scene detection. For example, in embodiments using IR proximity detection, an object (e.g., product 250) may be detected based on the modulation and/or reflection of IR light when the object (e.g., product 250) is placed in front of the optical imaging assembly 102. In embodiments using scene detection, detection of an object is determined by comparing scenes of different captured images (e.g., image frames) of multiple scanned images captured at different times to determine whether an object has moved in front of the optical imaging assembly 102, or otherwise determine that the scene in front of the optical imaging assembly 102 has changed. In either embodiment, once an object is detected, the optical imaging assembly 102 may transition to, or enter, its active mode as described above herein.

The scanning device may further include an RFID reader 112 having an RFID antenna 212. The RFID reader 112 may be configured to emit, via the RFID antenna 212, a radiation pattern 214. Radiation pattern 214 may comprise one or more radio waves transmitted in certain frequency(s) or wavelength(s).

In the embodiment of FIG. 2, the radiation pattern 214 is configured to extend over at least the optical FOV 206 and the effective reading range 204 of the optical image assembly 102 such that the RFID reader 112 is operable to read one or more RFID tags (e.g., 254, 260, and 262). For example, as shown in the embodiment of FIG. 2, RFID reader 112's radiation pattern 214 would extend over RFID tag 254 (as attached to product 250) and additional RFID tags within radiation pattern 214. Thus, RFID tags 254, 260, and 262 are read by the RFID reader 112. In contrast, RFID tag 270 is outside the range of RFID reader 112, and, thus would not be read. RFID tags 260, 262, and 270 may be tags associated with other products in the same retail facility, warehouse, etc. as the scanning device 100 and/or product 250.

As depicted in the embodiment shown in FIG. 2, the radiation pattern 214 of the RFID reader 112 is configured to extend a distance equal to or approximately equal to the effective reading range 204 of the optical imaging assembly 102.

In the embodiment, of FIG. 2, RFID tag 254, as associated with product 250, is within the RFID reader 112's radiation pattern 214 and barcode 252, as associated with product 250, is within the effective reading range 204 of the optical imaging assembly 102. Processor 222 of scanning device 100 is communicatively coupled to the optical image assembly 102 and the RFID reader 112. In the embodiment of FIG. 2, processor 222 is configured to initiate a scanning session when a product (e.g., product 250) enters the effective reading range 204 and the optical FOV 206 of the optical imaging assembly 102, or, in the alternative, to initiate the scanning session when the product (e.g., product 250) enters radiation pattern 214 of RFID reader 112. The scanning session may be defined by a duty cycle, time period, or may be defined by a sequence of activation events, such as the sequence of activation of the optical imaging assembly 102 and/or RFID reader 112 as described herein.

As described herein, in certain embodiments, the product 250 may, for example, be detected entering the effective reading range 204 and within the optical FOV 206 based on image feature object detection, IR proximity detection, or image scene detection. As described herein, in such embodiments, the optical imaging assembly 102 may be operating in a presentation mode operable for power conservation purposes.

In the embodiment of FIG. 2, during the scanning session, processor 222 is configured to activate the optical imaging assembly 102 and activate the RFID reader, e.g., in order to read or scan data or information associated with the detected product (e.g., read or scan barcode 252 and/or RFID tag 254 information of product 250).

Processor 222 is also configured to terminate the scanning session upon the occurrence of at least one of (1) the optical imaging assembly 102 scanning a product code (e.g., barcode 252) associated with the product (e.g., product 250), or (2) the RFID reader 112 reading an RFID tag (e.g., RFID tag 254) associated with the product (e.g., product 250).

In some embodiments, processor 222, during a scanning session, may be further configured to terminate the scanning session upon the occurrence of a timeout period elapsing (e.g., 2 to 5 seconds). In certain embodiments, the timeout period is configurable or adjustable, e.g., where processor 222 is able to operate the scanning session during a configured time period.

In further embodiments, the RFID reader 112 may be configured to read each RFID tag present within radiation pattern 214 (e.g., each of RFID tags 254, 260, and 262) only once during the scanning session. In such embodiments, reading each tag once may conserve power and/or reduce the number of false positive reads, if any.

In additional embodiments, an RFID tag (e.g., RFID tag 254) may be a newly detected RFID tag such that the RFID reader 112 reading the newly detected RFID tag may cause activation of the optical imaging assembly 102. In such embodiments, the optical imaging assembly, prior to the activation, may be in a low power mode or off mode.

In some embodiments, the optical imaging assembly 102 may be configured to operate in a low power mode or presentation mode. In some embodiments, the low power mode of the optical imaging assembly 102 may prevent the optical imaging assembly 102 from acquiring images. In such embodiments, image sensor 202 may be configured to an off state, or be configured to otherwise avoid acquiring images. In still further embodiments, the illumination and aiming features, modules, or devices of the optical imaging assembly 102 may also be disabled. In such embodiments, barcodes (e.g., barcode 252) within effective reading range 204 will not be read.

In still further embodiments, and as described herein, the optical imaging assembly 102 may be further configured, upon activation of the optical imaging assembly 102 by processor 222, to enter an active mode for scanning images. In such the illumination and image acquisition features, modules, or devices of the optical imaging assembly 102 are activated to full, or near full, performance such that images (e.g., of barcode 252) are actively captured and processed for encoding.

In additional embodiments, RFID reader 112 may be set to operate at various power modes, e.g., for power saving purposes. For example, as similarly described for optical imaging assembly 102, RFID reader 112 may be configured to operate in a low power mode or presentation mode. In certain embodiments, the low power mode of RFID reader 112 may cause the transmit and receive functions of the RFID reader 112 to be disabled. Thus, in low power mode, tags within RFID reader 112's radiation pattern 214 may not be read. In addition, in low power mode, a digital acquisition system of the RFID reader can be left idle, or can be made inactive, but with state retention, which may result in additional power savings.

The presentation mode of RFID reader 112 may cause the RFID reader 112 to operate in a low transmit duty cycle, which uses reduced power compared to when the scanning device 100 is in a tag reading mode. For example, presentation mode may configure RFID reader 112 with a low transmit duty cycle, such as a 10% transmit duty cycle. This saves power and reduces heat at the expense of tag read throughput.

When RFID reader 112 is in a low power mode or a presentation mode, the RFID reader 112 may be further configured, upon activation of the RFID reader 112, to enter a tag reading mode. The tag reading mode may include operating, for a time, the scanning device 100 at a higher power mode for reading RFID tags (e.g., RFID tag 254). For example, when a new RFID tag is to be read, a more aggressive transmit duty cycle (standard tag read mode) can be implemented for a time to attempt to decode RFID tag information when an object is detected within the radiation pattern 214, the effective reading range 204 and/or the optical FOV 206 of the optical imaging assembly 102, or otherwise as described herein. Active mode for RFID reader 112 may cause the transmit functions of RFID reader 112, and its RFID antenna 212, to operate at full, or near full, capability for optimal RFID tag read performance.

Figure 3:
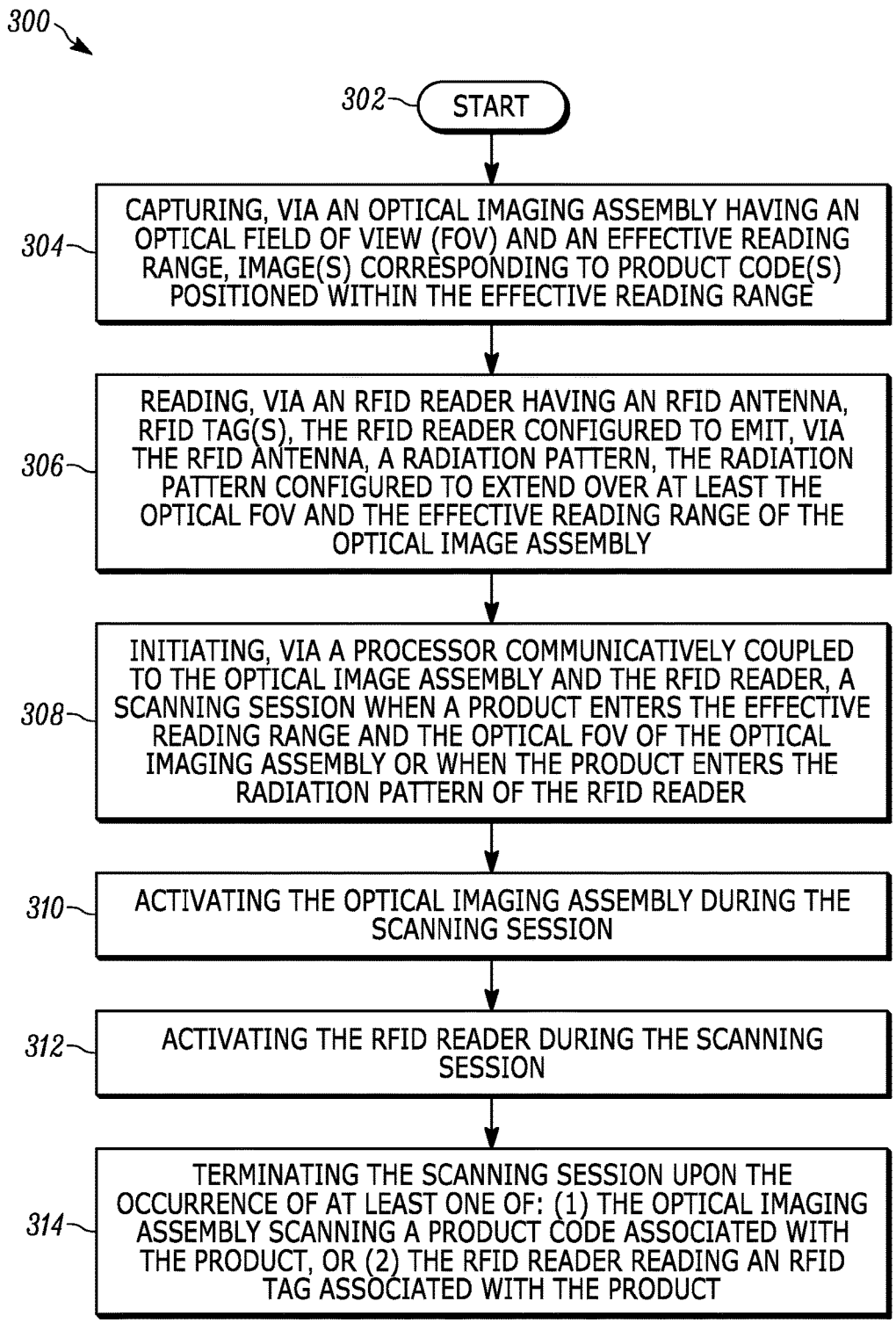
FIG. 3 illustrates a method of using the example scanning device of FIG. 1 for enabling RFID sessions based on imager based object detection in accordance with various embodiments disclosed herein.

FIG. 3 illustrates a method 300 of using the example scanning device 100 of FIG. 1 for enabling RFID sessions based on imager based object detection in accordance with various embodiments disclosed herein. Method 300 begins (302) at block 304, where, for example, a scanning device (e.g., scanning device 100) captures, via an optical imaging assembly (e.g., optical imaging assembly 102) having an optical FOV (e.g., optical FOV 206) and an effective reading range (e.g., effective reading range 204), one or more images corresponding to one or more product codes (e.g., barcode 252) positioned within the effective reading range.

At block 306, method 300 includes reading, via an RFID reader (e.g., RFID reader 112) having an RFID antenna (e.g., RFID antenna 212), one or more RFID tags (e.g., RFID tag 254), the RFID reader configured to emit, via the RFID antenna, a radiation pattern (e.g., radiation pattern 214), the radiation pattern configured to extend over at least the optical FOV and the effective reading range of the optical image assembly.

At block 308, method 300 includes initiating, via a processor (e.g., processor 222) that is communicatively coupled to the optical image assembly and the RFID reader, a scanning session when a product (e.g., product 250) enters the effective reading range and the optical FOV of the optical imaging assembly or when the product enters the radiation pattern of the RFID reader.

At block 310, method 300 includes activating the optical imaging assembly (e.g., optical imaging assembly 102) during the scanning session.

At block 312, method 300 includes activating the RFID reader (e.g., RFID reader 112) during the scanning session.

At block 314, method 300 includes terminating the scanning session upon the occurrence of at least one of: (1) the optical imaging assembly scanning a product code associated with the product, or (2) the RFID reader reading an RFID tag associated with the product.

Additional embodiments, features, or functionality may also be implemented for method 300 in accordance with the disclosures herein for the scanning device 100 or as described elsewhere herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A scanning device for enabling radio frequency identification (RFID) sessions based on imager based object detection, the scanning device comprising:
    an optical imaging assembly having an optical field of view (FOV) and an effective reading range, the optical imaging assembly operable to capture one or more images corresponding to one or more product codes positioned within the effective reading range;
    an RFID reader having an RFID antenna, the RFID reader configured to emit, via the RFID antenna, a radiation pattern, the radiation pattern configured to extend over at least the optical FOV and the effective reading range of the optical image assembly, the RFID reader operable to read one or more RFID tags; and
    a processor communicatively coupled to the optical image assembly and the RFID reader, the processor configured to:
        detect a product entering the effective reading range and within the optical FOV based on any of: image feature object detection, infrared (IR) proximity detection, or image scene detection, and
        responsive to detecting the product:
            switch the optical imaging assembly from a presentation mode to an active mode,
            activate the RFID reader, and
            terminate the scanning session upon the occurrence of at least one of: (1) the optical imaging assembly scanning a product code associated with the product, or (2) the RFID reader reading an RFID tag associated with the product.

2. The scanning device of claim 1, wherein the processor, during the scanning session, is further configured to terminate the scanning session upon the occurrence of a timeout period elapsing.

3. The scanning device of claim 1, wherein the RFID reader is configured to operate in a low power mode or presentation mode, and wherein the RFID reader is further configured, upon activation of the RFID reader by the processor, to enter a tag reading mode.

4. The scanning device of claim 3, wherein the low power mode causes the transmit and receive functions of the RFID reader to be disabled.

5. The scanning device of claim 3, wherein the presentation mode causes the RFID reader to operate in a low transmit duty cycle.

6. The scanning device of claim 1, wherein the radiation pattern is configured to extend a distance equal to or approximately equal to the effective range of the optical imaging assembly.

7. The scanning device of claim 1, wherein the RFID reader is configured to read each RFID tag present within the radiation pattern only once during the scanning session.

8. The scanning device of claim 1, wherein the product code is a barcode.

9. The scanning device of claim 1, wherein the product code is a quick response (QR) code.

10. A scanning device for enabling barcode reading based sessions based on radio frequency identification (RFID) tag detection, the scanning device comprising:
- an optical imaging assembly having an optical field of view (FOV) and an effective reading range, the optical imaging assembly operable to capture one or more images corresponding to one or more product codes positioned within the effective reading range;
- an RFID reader having an RFID antenna, the RFID reader configured to emit, via the RFID antenna, a radiation pattern, the radiation pattern configured to extend over at least the optical FOV and the effective reading range of the optical image assembly, the RFID reader operable to read one or more RFID tags; and
- a processor communicatively coupled to the optical image assembly and the RFID reader, the processor configured to detect a newly detected RFID tag entering the radiation pattern of the RFID reader, and responsive to detecting the newly detected RFID tag activate the optical imaging assembly in active mode.

* * * * *